US 8,767,135 B2

(12) United States Patent
Hikmet et al.

(10) Patent No.: US 8,767,135 B2
(45) Date of Patent: Jul. 1, 2014

(54) LIGHTING APPARATUS FOR GENERATING A LIGHT PATTERN

(75) Inventors: Rifat Ata Mustafa Hikmet, Eindhoven (NL); Ties Van Bommel, Eindhoven (NL); Yongfeng Ni, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 170 days.

(21) Appl. No.: 13/497,258

(22) PCT Filed: Sep. 9, 2010

(86) PCT No.: PCT/IB2010/054068
§ 371 (c)(1),
(2), (4) Date: Mar. 21, 2012

(87) PCT Pub. No.: WO2011/036594
PCT Pub. Date: Mar. 31, 2011

(65) Prior Publication Data
US 2012/0169952 A1    Jul. 5, 2012

(30) Foreign Application Priority Data

Sep. 22, 2009 (EP) .................................. 09170953

(51) Int. Cl.
*G02F 1/133* (2006.01)
*G02F 1/1335* (2006.01)
*F21V 7/04* (2006.01)

(52) U.S. Cl.
USPC ................ 349/34; 349/69; 362/611; 362/613

(58) Field of Classification Search
USPC .................. 349/34, 69; 362/611, 613
See application file for complete search history.

(56) References Cited

U.S. PATENT DOCUMENTS

| | | | |
|---|---|---|---|
| 3,822,930 A | 7/1974 | Douklias | |
| 2003/0021534 A1* | 1/2003 | Fujieda | ............................ 385/37 |
| 2008/0298192 A1* | 12/2008 | Bakker | ...................... 369/53.25 |

FOREIGN PATENT DOCUMENTS

DE    4119975 A1    12/1992

OTHER PUBLICATIONS

Stone T W et al. "Performance of photonic switching systems based on electro-optic volume holographic diffraction gratings". Proceedings of the SPIE—the International Society for Optical Engineering, SPIE, US, vol. 4112, Jul. 31, 2000, pp. 38-47. XP008002091.
Rodrigo, P J et al. "Shack-Hartmann multiple-beam optical tweezers". Optics and Fluid Dynamics Department, Riso National Laboratory, DK-4—Roskilde, Denmark. Feb. 10, 2003, vol. 11, No. 3 Optics Express 208.

(Continued)

*Primary Examiner* — Mike Qi
(74) *Attorney, Agent, or Firm* — Yuliya Mathis

(57) ABSTRACT

The invention relates to a lighting apparatus (1) for generating a light pattern. A light source (4) generates a light beam (5) for being directed onto a liquid crystal cell (2). The liquid crystal cell (2) comprises a periodic structure (3). If voltage is applied to the liquid crystal cell (2) by a voltage source (8), a period phase pattern is generated. The liquid crystal cell (2) and the light source (4) are adapted such that multiple separate light beams (6) are generated in different directions by diffraction at the generated periodic phase pattern, wherein the multiple separate light beams (6) form the light pattern (7). Since the light pattern is generated by diffraction at the periodic phase pattern, which is modifiable by applying voltage, different light patterns can be generated, in particular, for decorative purposes, in a technically relatively simple way.

19 Claims, 14 Drawing Sheets

(56) References Cited

OTHER PUBLICATIONS

Li Ge, M D et al. "Enumeration of illumination and scanning modes from real-time spatial light modulators". ElectroOptics Research Institute, University of Louisville, KY. Dec. 4, 2000, vol. 7, No. 12 Optics Express 403.

* cited by examiner

LIGHTING APPARATUS FOR GENERATING A LIGHT PATTERN

FIELD OF THE INVENTION

The invention relates to a lighting apparatus, a lighting method and lighting computer program for generating a light pattern. The invention relates further to a product presentation apparatus comprising the lighting apparatus and a corresponding product presentation method for presenting a product.

BACKGROUND OF THE INVENTION

The Article "Enumeration of Illumination on Scanning Modes from Real-Time Spatial Light Modulators", Li Ge et al., Vol. 7, No. 12, Optics Express, pages 403-416, 2000, discloses to use a phase-only spatial light modulator (SLM) in a Fourier-transform set-up together with fast diffractive optics design algorithms for automatically generating complex and rapidly changing laser illumination patterns in the far-field. The spatial light modulator comprises several pixel elements, wherein each pixel element allows to change the phase of the part of a coherent laser beam which meets the respective pixel element. Thus, a broad laser beam covering the different pixel elements is directed onto the spatial light modulator and the phase of the different parts of the broad laser beam, which meet the respective pixel elements of the spatial light modulator, is modified by the respective pixel element. Each pixel element of the spatial light modulator is separately addressable, thereby allowing to modify the phases of different parts of the broad laser beam differently. After leaving the spatial light modulator, the different parts of the broad laser beam, which comprise now different phases, interfere and generate a light pattern which can be used for illuminating, for example, an object. By modifying the phases of the different parts of the broad laser beam by using the several pixel elements, different light patterns can be generated.

The spatial light modulator is a technically complex system which is bulky and expensive.

SUMMARY OF THE INVENTION

It is an object of the present invention to provide a lighting apparatus for generating a light pattern being technically less complex. It is a further object of the present invention to provide a corresponding lighting method and lighting computer program for generating a light pattern. Moreover, it is an object of the present invention to provide a product presentation apparatus comprising the lighting apparatus and a corresponding product presentation method for presenting a product.

In a first aspect of the present invention a lighting apparatus for generating a light pattern is presented, wherein the lighting apparatus comprises:
 a liquid crystal cell comprising a periodic structure for generating a periodic phase pattern by applying a voltage to the liquid crystal cell,
 a light source for generating a light beam for being directed onto the liquid crystal cell,
 a voltage source for applying voltage to the liquid crystal cell, wherein the liquid crystal cell and the light source are adapted such that multiple separate light beams are generated in different directions by diffraction at the generated periodic phase pattern, wherein the multiple separate light beams form the light pattern.

Since the light pattern is generated by diffraction at the periodic phase pattern generated by applying a voltage to the liquid crystal comprising a periodic structure, it is not necessary to provide a spatial light modulator having several pixel elements which are separately addressable. This leads to a lighting apparatus being less technically complex and, in particular, less bulky and less expensive. Moreover, although the lighting apparatus is technically less complex, it is still possible to modify the light pattern by applying a voltage to the liquid crystal cell. In particular, the light pattern can be switched on and off by switching between voltage on and off.

The light source is preferentially a collimated light source, in particular, a laser.

The periodic structure is preferentially a periodic electrode structure.

It is preferred that an intensity distribution is defined by the intensities of the multiple separate light beams, i.e. the outgoing multiple separate light beams, wherein the liquid crystal cell and the light source are adapted such that the intensity distribution of the outgoing light beams produced by the liquid crystal cell is modifiable by modifying the voltage applied to the liquid crystal cell.

This allows generating different intensity distributions by modifying the voltage applied to the liquid crystal cell. In particular, the light beam originating from the light source has a beam width being similar to the beam widths of the separate light beams generated in different directions by diffraction at the generated periodic phase pattern. Thus, the beam widths of the different separate light beams generated by diffraction are preferentially the same, and their intensities can be modified by modifying the voltage applied to the liquid crystal cell.

It is further preferred that the lighting apparatus comprises a projection surface, wherein the light source and/or the liquid crystal cell are adapted such that the multiple separate light beams form non-overlapping spots on the projection surface.

The non-overlapping spots preferentially form a high intensity pattern on a background illumination such that the light pattern is visible under normal background illumination conditions. The intensity of the spots is therefore preferentially 10 W/m$^2$ or larger, further preferred 1000 W/m$^2$ or larger, and even further preferred 10000 W/m$^2$ or larger.

It is further preferred that the liquid crystal cell comprises at least one of a graded refractive index lens array using Double Plane Switching (DPS), a graded refractive index lens array using In Plane Switching (IPS), a graded refractive index lens array using Fringe Field Switching (FFS), a replicated liquid crystal lens array and a pattern-wise polymerized liquid crystal cell.

In a DPS configuration the liquid crystal is placed between two substrates with patterned electrodes on the surfaces of the two substrates facing the liquid crystal. The voltage, i.e. the electric field, is applied across the substrates between opposing electrodes on the two substrates. This configuration provides a high design freedom of the electrode patterns, which can be used to obtain a desired electrode pattern.

In an IPS configuration the liquid crystal is also placed between two substrates. However, the electrodes are located only on one of the substrates, i.e. on one surface, which faces the liquid crystal, of one substrate. Positive and negative electrodes are placed next to each other, in particular, alternately. The IPS configuration does not need a careful alignment of the electrodes on different surfaces with respect to each other.

Also in a FFS configuration a liquid crystal is placed between two substrates. However, here again the electrodes are placed only on one side of the liquid crystal, i.e. on one surface facing the liquid crystal. On a surface of the substrate facing the liquid crystal a stack is provided, wherein the stack comprises, starting from the surface of the substrate, which faces the liquid crystal, a full surface covering electrode, a dielectric layer and a patterned electrode. Also in this configuration no alignment of opposing electrodes on different substrates is necessary, and complicated electrode patterns can be obtained.

In a replicated liquid crystal lens array configuration the liquid crystal is placed between two substrates, wherein the two surfaces of the two substrates facing the liquid crystal cell comprise full surface covering electrodes. At least one of the full surface covering electrodes comprises a replicated structure. Also this configuration does not need an alignment of opposing electrodes on different substrates.

The pattern-wise polymerized liquid crystal cell comprises preferentially a first substrate and a second substrate. Between the first substrate and the second substrate first regions with more liquid crystal material and less polymer material and second regions with less liquid crystal material and more polymer material are alternately arranged for forming a periodic structure. The surfaces of the first substrate and the second substrate, which face the liquid crystal material and the polymer material, are preferentially provided with full surface electrodes.

It is further preferred that the light source emits at least two light beams being directed onto the liquid crystal cell in different directions.

It is further preferred that the lighting apparatus further comprises a passive diffractive element arranged between the light source and the liquid crystal cell, wherein the passive diffractive element is adapted to divide the light generated by the light source into several light beams for being directed onto the liquid crystal cell.

It is further preferred that the lighting apparatus comprises a first liquid crystal cell for collimating light depending on an applied voltage and a second liquid crystal cell comprising a periodic structure for generating a periodic phase pattern by applying voltage to the second liquid crystal cell, wherein the light source, the first liquid crystal cell and the second liquid crystal cell are arranged such that the light beam generated by the light source is directed onto the first liquid crystal cell for collimating the light beam generated by the light source, wherein the collimated light beam is directed onto the second liquid crystal cell for generating the multiple separate light beams in different directions by diffraction.

It is further preferred that the lighting apparatus comprises at least a first liquid crystal cell comprising a first periodic structure for generating a first periodic phase pattern by applying voltage to the first liquid crystal cell and a second liquid crystal cell comprising a second periodic structure for generating a second periodic phase pattern by applying voltage to the second liquid crystal cell, wherein the coherent light source, the first liquid crystal cell and the second liquid crystal cell are arranged such that the light beam generated by the light source is directed onto the first liquid crystal cell for generating several first diffracted light beams being directed onto the second liquid crystal cell for generating the multiple separate light beams in different directions by diffraction.

This allows increasing the variability of the light patterns, which can be generated by the lighting apparatus.

It is further preferred that the lighting apparatus comprises more than two liquid crystal cells, which are preferentially arranged such that the light outgoing from at least one of the liquid crystal cells is directed to at least one other of the liquid crystal cells, i.e. in particular the lighting apparatus can comprise a sequence of liquid crystal cells.

It is further preferred that the lighting apparatus comprises a control unit for controlling at least one of the light source and the voltage source such that the intensity of each of the multiple light beams generated by diffraction is below a predefined threshold. The predefined threshold is preferentially related to eye safety. The control unit can comprise a calibration curve relating the voltage to a maximum power of the light source ensuring eye safety. This allows ensuring that persons are not adversely affected by the generated light pattern. Moreover, this allows controlling the intensity of the separate light beams generated by diffraction without directly measuring the intensity of these multiple separate light beams. For example, it is not necessary to provide photodiodes for measuring the intensity of the multiple separate light beams generated by diffraction directly. This further simplifies the lighting apparatus.

In a further embodiment, the lighting apparatus comprises an intensity determination unit for determining the intensity of the multiple separate light beams, wherein the control unit is adapted to control at least one of the light source and the voltage source such that the intensity of each of the multiple light beams generated by diffraction is below a predefined threshold depending on the determined intensity of the multiple separate light beams.

In a further aspect of the present invention a product presentation apparatus for presenting a product is provided, wherein the product presentation apparatus comprises a presentation area in which the product is to be placed and a lighting apparatus as defined in claim 1, wherein the lighting apparatus is adapted to direct the multiple separate light beams to the presentation area for forming the light pattern in the presentation area.

In a further aspect of the present invention a lighting method for generating a light pattern is presented, wherein the lighting method comprises following steps:

applying voltage to a liquid crystal cell comprising a periodic structure for generating a periodic phase pattern, generating a light beam for being directed onto the liquid crystal cell, wherein multiple separate light beams are generated in different directions by diffraction at the generated periodic phase pattern, wherein the multiple separate light beams form the light pattern.

In a further aspect of the present invention a product presentation method for presenting a product is presented, wherein the product presentation method comprises following steps:

placing a product in a presentation area, generating multiple separate light beams for forming a light pattern as defined in claim 11, wherein the multiple separate light beams are directed to the presentation area for forming the light pattern in the presentation area.

In a further aspect of the present invention a lighting computer program for generating a light pattern is presented, wherein the computer program comprises program code means for causing a lighting apparatus as defined in claim 1 to carry out the steps of the lighting method as defined in claim 11, when the computer program is run on a computer controlling the lighting apparatus.

It shall be understood that the lighting apparatus of claim 1, the product presentation apparatus of claim 10, the lighting method of claim 11, the product presentation method 12 and the lighting computer program of claim 13 have similar and/or identical preferred embodiments as defined in the dependent claims.

It shall be understood that a preferred embodiment of the invention can also be any combination of the dependent claims with the respective independent claim.

The above mentioned aspects and other aspects of the invention will be apparent from and elucidated with reference to the embodiments described hereinafter.

DETAILED DESCRIPTION OF EMBODIMENTS

Figure 1:
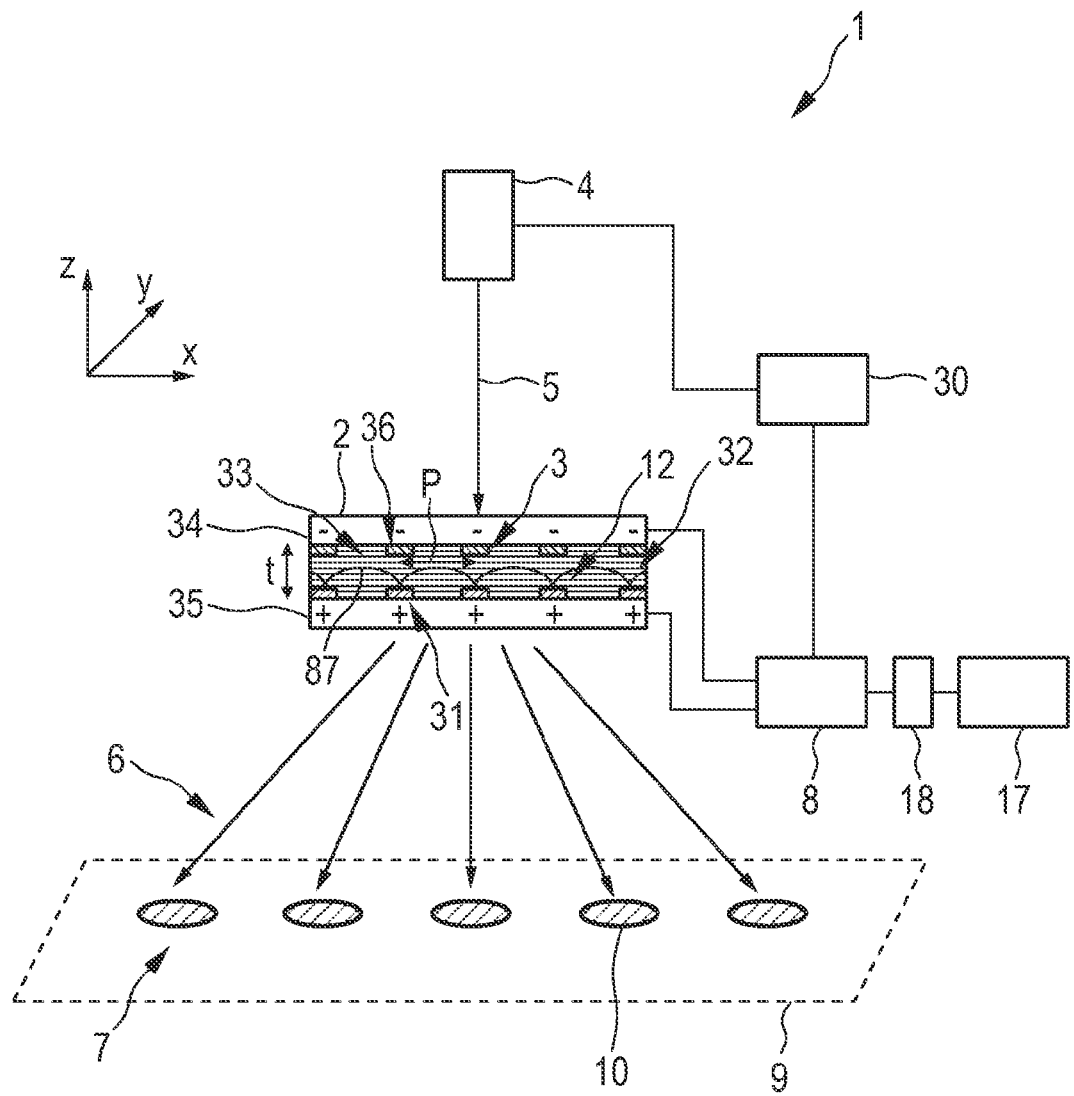
FIG. 1 shows schematically and exemplarily a representation of a lighting apparatus for generating a light pattern, FIG. 2 exemplarily illustrates the generation of a light pattern by diffraction, FIGS. 3 to 6 schematically and exemplarily show embodiments of a liquid crystal cell, which can be used by the lighting apparatus.

FIG. 1 shows schematically and exemplarily a lighting apparatus 1 for generating a light pattern. The lighting apparatus 1 comprises a liquid crystal cell 2 with a periodic structure 3 for generating a periodic phase pattern by applying voltage to the liquid crystal cell 2. In this embodiment, the liquid crystal cell 2 is a graded refractive index lens array using double plane switching.

The liquid crystal cell 2 comprises a liquid crystal 32 placed between a two substrates 34, 35. The surfaces of the substrates 34, 35, which face the liquid crystal 32, are provided with electrodes 31, 36 forming the periodic structure 3. The electrodes 31, 36 form the periodic structure 3. The substrates preferentially further comprise an orientation layer (not shown) to induce a macroscopic orientation of liquid crystal molecules of the liquid crystal 32. Voltage, i.e. an electric field, is applied across the electrodes 31, 36 by a voltage generator 8. The electric field leaks into outside areas 33 being not located between two opposing electrodes. Due to the leakage of the electric field lines into these outside areas 33 an electric field gradient within the liquid crystal cell is induced. As a result of this field gradient liquid crystal molecules become differently oriented at various places within the cell leading to an effective refractive index variation, i.e. gradient, within the cell. If a periodic electrode pattern is used, a periodic refractive index, i.e. phase, pattern occurs within the cell.

The lighting apparatus 1 further comprises a light source 4 for generating a light beam 5 for being directed onto the liquid crystal cell 2. The light source 4 is preferentially a collimated and most preferentially coherent light source like a laser. The voltage source 8 is used for applying voltage to the liquid crystal 32, in particular, for applying alternating voltage to the liquid crystal 32. To each pair of opposing electrodes of the periodic electrode pattern 3 the same alternating voltage is applied. The electrodes 31 are connected to each other such that there are not addressed separately. Also the electrodes 36 are connected to each other such that there are not addressed separately. The use of alternating voltage avoids accumulation of ionic charges in the liquid crystal cell 2.

By applying the alternating voltage to the liquid crystal cell 2, a periodic phase pattern is generated in the liquid crystal cell 2. The liquid crystal cell 2 and the light source 4 are adapted such that multiple separate light beams 6 are generated in different directions by diffraction at the generated periodic phase pattern, wherein the multiple separate light beams 6 form a light pattern 7. The multiple separate light beams 6 form non-overlapping spots 10 on a projection surface 9. The liquid crystal cell 2 and the light source 4 are adapted such that the intensity distribution defined by the intensities of the multiple spots 10 is modifiable by modifying the voltage applied to the liquid crystal cell 2. Thus, by modifying the voltage applied to the liquid crystal cell 2 the intensity of the spots in the light pattern 7 can be modified.

The light beam 5 generated by the light source 4 is preferentially sized and collimated such that the spots 10 do not overlap on the projection surface 9.

If voltage is applied to the liquid crystal cell 2 a periodic phase pattern 87 appears as schematically and exemplarily indicated in FIG. 1. This period phase pattern then leads to a retardation profile 12 schematically and exemplarily shown in FIG. 2. For an infinitesimal beam of light going through the cell at a position $(x_1, y_1)$ in an x-y plane of the cell, the retardation of light is given by $$R_1(x_1, y_1) = \int_0^t n_1(z)\,dz,$$

where $n_1(z)$ is the effective refractive index of the liquid crystal at the position $(x_1, y_1)$ along the z axis, i.e. along the thickness direction of the liquid crystal cell 2, and t is the thickness of the liquid crystal material. The generation of the retardation profile 12 and of the corresponding light pattern 7 will in the following be described in more detail with reference to FIG. 2.

Figure 2:
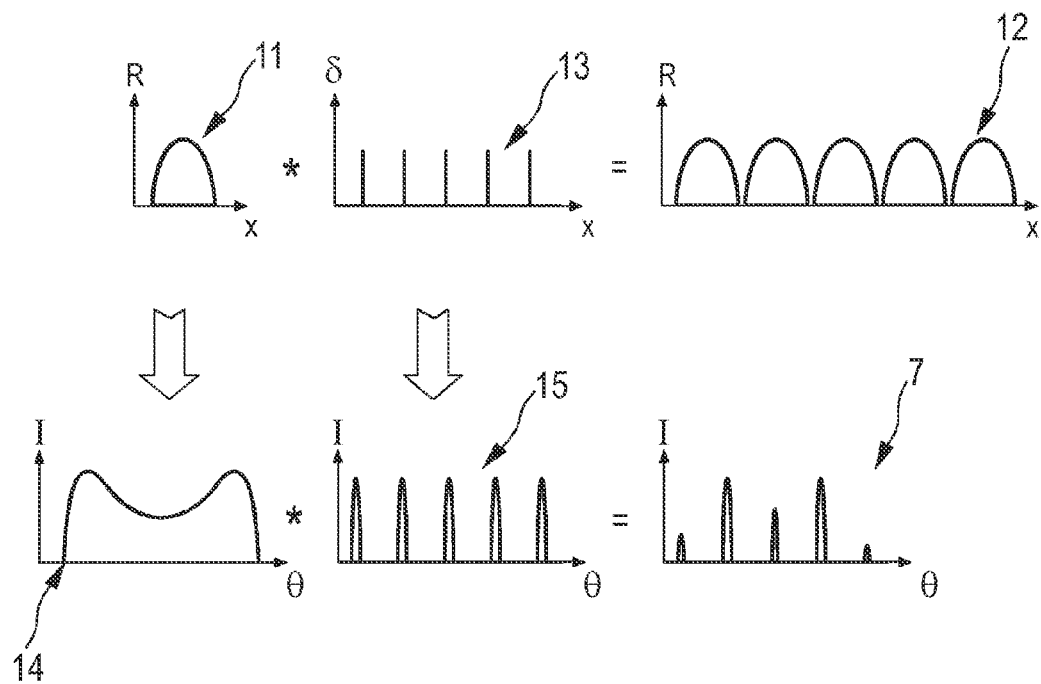

If voltage is applied to the liquid crystal cell 2, between a pair of adjacent electrodes a phase profile is generated, which yields the retardation profile 11 shown in FIG. 2. The periodic structure 3 of the liquid crystal 2 is shown in FIG. 2 as several delta functions 13. The combination of the retardation profile 11 between adjacent electrodes and of the delta functions 13 leads to the retardation profile 12. If the liquid crystal cell is illuminated, the retardation profile 11 leads to the intensity distribution 14 as a function of the diffraction angle θ, which is schematically and exemplarily shown in FIGS. 9 and 10. The periodic structure 3 represented by the delta functions 13 results in the intensity distribution 15, wherein the final light pattern 7 is generated by combining the intensity distribution 14 of a single pair of opposing electrodes and the intensity distribution 15 of the periodic structure 3. The periodicity in the system is determined by the electrode pattern. Therefore, the intensity distribution 15 and the angular positions of the multiple diffracted light beams forming the light pattern 7 remain unchanged, if the applied voltage is modified. However, if the applied voltage is modified, the retardation profile 11 of a pair of adjacent electrodes can be modified, leading to a modification of the distribution of intensities at the different angular positions θ. In other words, in FIG. 2 the angular positions of the different peaks remains substantially unchanged, but the height of the different peaks can be modified by modifying the applied voltage.

In order to induce a refractive index gradient being sufficient for obtaining the desired light pattern, the liquid crystal material thickness t is preferentially in the order of the period p of the periodic pattern 3. The thickness t is preferentially 0.1p or larger, further preferred 0.5p or larger, and even further preferred p or larger.

Instead of using a graded refractive index lens array with double plane switching, another kind of liquid crystal cell can be used. For example, the graded refractive index lens array with in-plane switching shown in FIG. 3 or with fringe field switching as shown in FIG. 4 can be used.

Figure 3:
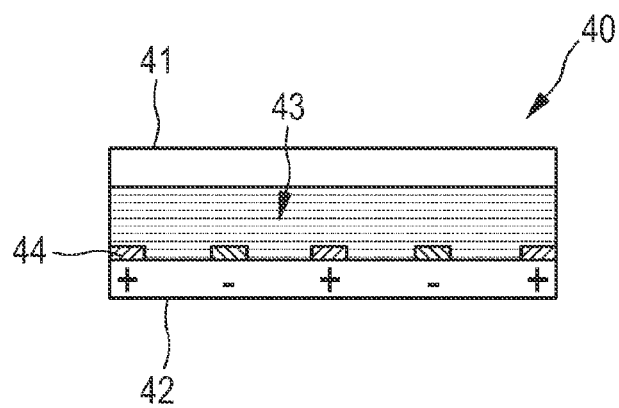

FIG. 3 shows schematically and exemplarily a graded refractive index lens array 40 with in-plane switching (IPS). In the IPS configuration shown in FIG. 3, the liquid crystal material 43 is arranged between a first substrate 41 and a second substrate 42. Electrodes 44 are located only on the second substrate 42, i.e. on the surface of the second substrate 42 facing the liquid crystal material 43. Positive and negative electrodes 44 are placed next to each other, in particular, alternately.

Figure 4:
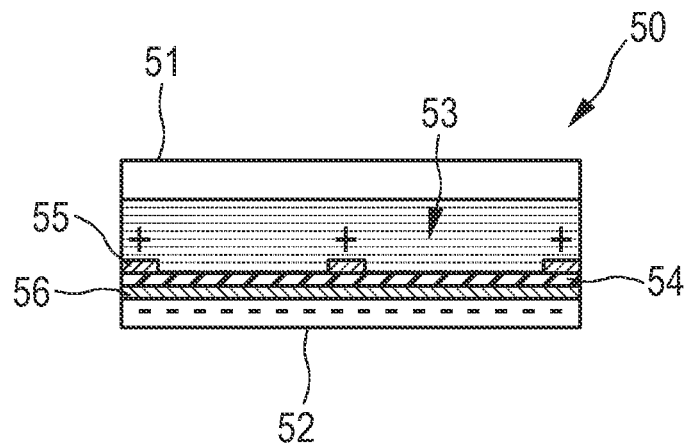

FIG. 4 shows schematically and exemplarily a graded refractive index lens array 50 using fringe field switching (FFS). Also in the FFS configuration liquid crystal material 53 is placed between a first substrate 51 and a second substrate 52. Electrodes 55 are placed on one side of the liquid crystal material 53, i.e. on one surface facing the liquid crystal material 53. On a surface of the second substrate 52 facing the liquid crystal material 53 a stack is provided, wherein the stack comprises, starting from the surface of the second substrate 52, which faces the liquid crystal material 53, a full surface covering electrode 56, a dielectric layer 54 and a patterned electrode 55.

Figure 5:
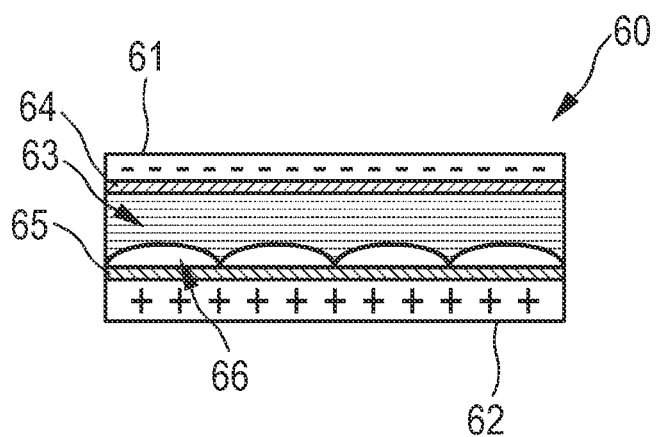

FIG. 5 shows schematically and exemplarily a replicated liquid crystal lens array configuration 60, which can also be used instead of the liquid crystal cell 2 shown in FIG. 1. The replicated liquid crystal lens array configuration comprises liquid crystal material 63 placed between a first substrate 61 and a second substrate 62. The two surfaces of the first substrate 61 and of the second substrate 62, respectively, comprise full surface covering electrodes 64, 65, respectively. At least one of the full surface covering electrodes 64, 65 comprises a replicated structure 66. The replicated structure is preferentially obtained by placing a photo-polymerizable monomer, in particular, an acrylic monomer, between a mould which corresponds to the desired replicated structure and the second substrate 62 which is covered by the electrode 65. A polymerization procedure is performed, and after the polymerization of the monomer, the mould is removed leaving behind the desired replicated structure. Orientation layers are provided on both sides of the liquid crystal material 63 such that they contact the liquid crystal material (not shown in FIG. 5), in order to obtain a microscopic orientation of liquid crystal molecules of the liquid crystal material 63. The orientation layers are preferentially chosen such that the liquid crystal molecules become oriented perpendicular to the first and second substrates 61, 62. In such an orientation of the liquid crystal molecules the refractive index of the replicated structure, i.e. of the polymer, is preferentially chosen such that it matches the refractive index of the liquid crystal. If the refractive index is chosen in this way, the liquid crystal cell will not show a significant diffraction, if the voltage is not applied to the liquid crystal cell. Upon application of the voltage, the liquid crystal molecules with a negative dielectric anisotropic orientation are altered and the refractive index gradient, i.e. the periodic phase pattern, becomes visible, thereby inducing the formation of the light pattern. An opposite behavior is obtained if orientation layers inducing a homogenous planar orientation of the liquid crystal molecules are used. In the latter case, if the voltage is not applied to the liquid crystal cell, a periodic phase pattern is present for generating the light pattern, wherein the periodic phase pattern gradually changes and optionally disappears, if a voltage is applied to the liquid crystal cell and modified.

Figure 6:
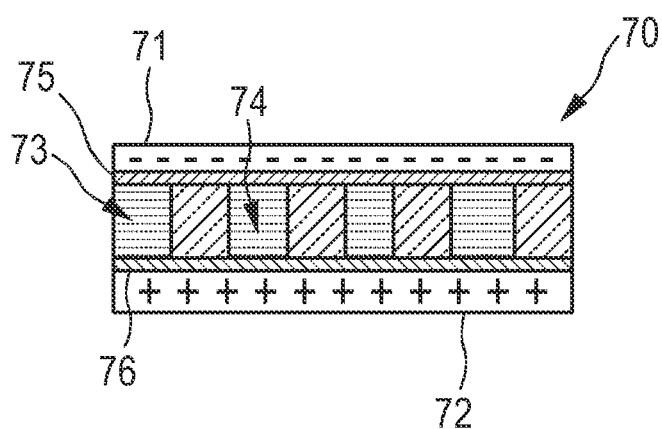

FIG. 6 shows schematically and exemplarily a pattern-wise polymerized liquid crystal cell 70, which could also be used instead of the liquid crystal cell 2 shown in FIG. 1. The pattern-wise polymerized liquid crystal cell 70 comprises a first substrate 71 and a second substrate 72. Between the first substrate 71 and the second substrate 72 first regions 73 with more liquid crystal material and less polymer material and second regions 74 with less liquid crystal material and more polymer material are alternately arranged for forming a periodic structure. The surfaces of the first substrate 71 and the second substrate 72, which face the liquid crystal material and the polymer material, are provided with full surface electrodes 75, 76.

In order to produce the pattern-wise polymerized liquid crystal material 73, 74, a mixture of photo-polymerizable monomers, in particular, of acrylic monomers, and liquid crystal material is placed in a cell with transparent electrodes. The cell with the mixture of the photo-polymerizable monomer and the liquid crystal material is pattern-wisely illuminated with a polymerization inducing light. After polymerization a transparent layer is formed containing second regions 74 with high polymer concentration and first regions 73 with low polymer concentrations. The first regions 73 with low polymer concentration comprise a relatively high liquid crystal material concentration. The second regions 74 with high polymer concentrations contain a low concentration of liquid crystal material. If voltage is applied to the pattern-wise polymerized liquid crystal cell, a periodic phase pattern is generated caused by the periodically varying concentration of liquid crystal material. By modifying the applied voltage the periodic phase pattern is modified, thereby allowing modifying the generated light pattern by modifying the applied voltage.

In each of the liquid crystal cells described above with reference to FIGS. 1 and 3 to 6 orientation layers are provided on both sides of the liquid crystal material, which are in contact with the liquid crystal material, in order to induce a macroscopic orientation of the liquid crystal molecules in the absence of an electric field.

In FIGS. 1 and 3 to 6 the minus and plus signs and in the description the terms "minus" and "plus" are only used to indicate electrodes having different polarity. It should be noted that alternating voltage is applied across the electrodes having different polarity. Moreover, the minus and plus signs in the FIGS. 1 and 3 to 6 are not located within the representations of the electrodes, but adjacent to the respective electrodes.

Although in the above described embodiments the periodic structure is a homogenous structure, i.e. the period of the periodic structure is always the same, in other embodiments the periodic structure can be inhomogeneous, i.e. the periodic structure can comprise different regions, wherein different regions comprise different periods of the periodic structure. In that case various light patterns can be formed by different fractions of the light beam passing through the liquid crystal cell with a periodic structure being different in different regions.

Figure 7:
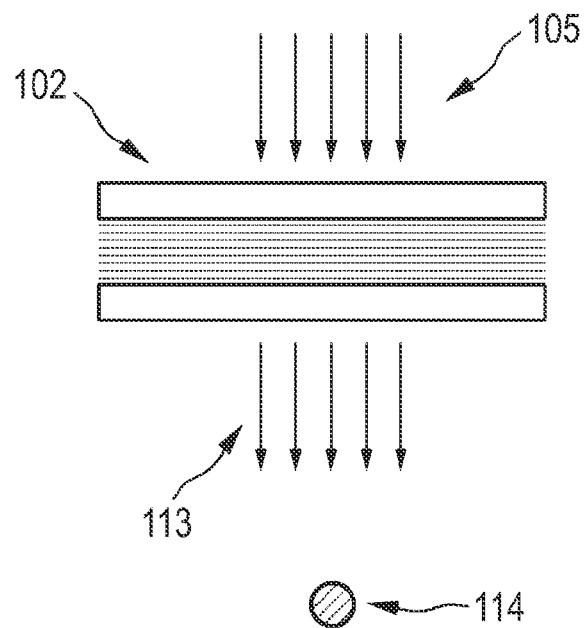
FIG. 7 shows schematically and exemplarily a lighting apparatus for generating a light pattern, wherein voltage is not applied to the lighting apparatus.
Figure 8:
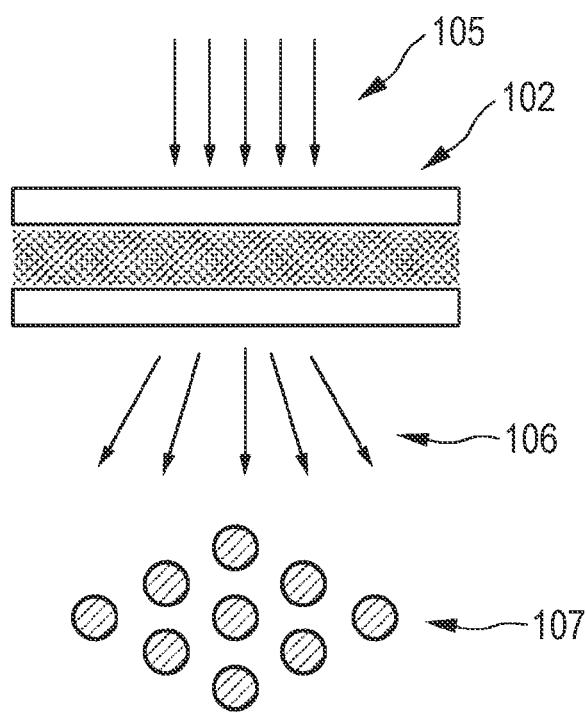
FIG. 8 shows schematically and exemplarily the lighting apparatus with applied voltage, FIG. 9 exemplarily illustrates a preferred relation between a collimation angle and a diffraction angle, FIG. 10 exemplarily illustrates a preferred relation between separation distances between light spots of the light pattern and beam widths.

FIGS. 7 and 8 show schematically and exemplarily the effect of applying voltage to a liquid crystal cell in accordance with the invention.

In FIG. 7, a voltage is not applied to a liquid crystal cell 102 comprising a periodic structure. The liquid crystal cell 102 can be similar to the liquid crystal cells explained above with reference to FIGS. 1 and 3 to 6. Since a voltage is not applied to the liquid crystal cell 102, the light 105 generated by a light source (not shown in FIG. 7) is not diffracted such that the transmitting light 113 forms a single spot 114 on a projection surface. In FIG. 8, a voltage has been applied to the liquid crystal cell 102 and a periodic phase pattern is generated. The light 105 is diffracted by the generated periodic phase pattern resulting in multiple separate light beams 106 generated in different directions. The multiple separate light beams 106 form a light pattern 107. Depending on the magnitude of the applied voltage, various spot patterns can be created. The periodic structures are smaller, in particular, much smaller, than the width of the light beam to produce the light pattern by diffraction. The period of the periodic structure is preferentially 100 micron or smaller, further preferred 50 micron or smaller and even further preferred 20 micron or smaller.

Figure 9:
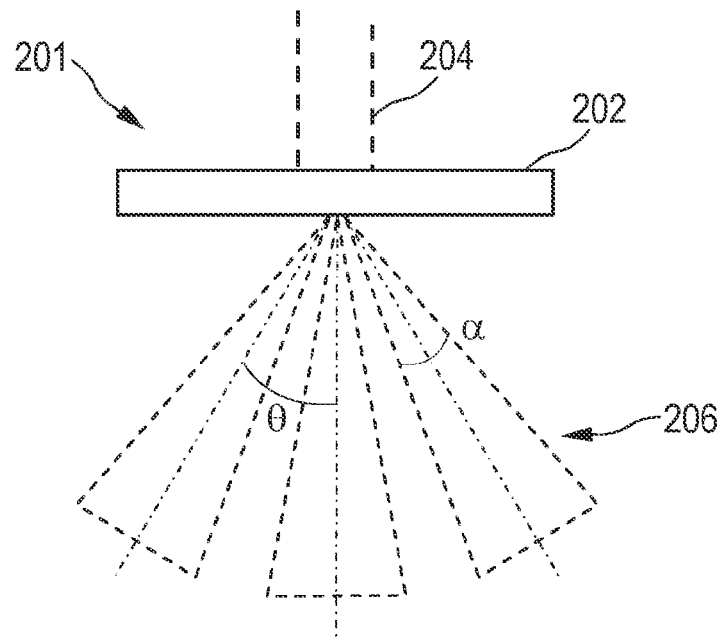

As schematically and exemplarily illustrated in FIG. 9, in order to obtain a light pattern comprising light spots, which do not overlap, a light source providing a light beam 204 and/or a liquid crystal cell 202 of a lighting apparatus in accordance with the invention are adapted such that the collimation angle α of multiple separate light beams 206 is less than the diffraction angle θ of these multiple separate light beams. In the embodiment shown in FIG. 9 the multiple separate light beams 206 are divergent.

Figure 10:
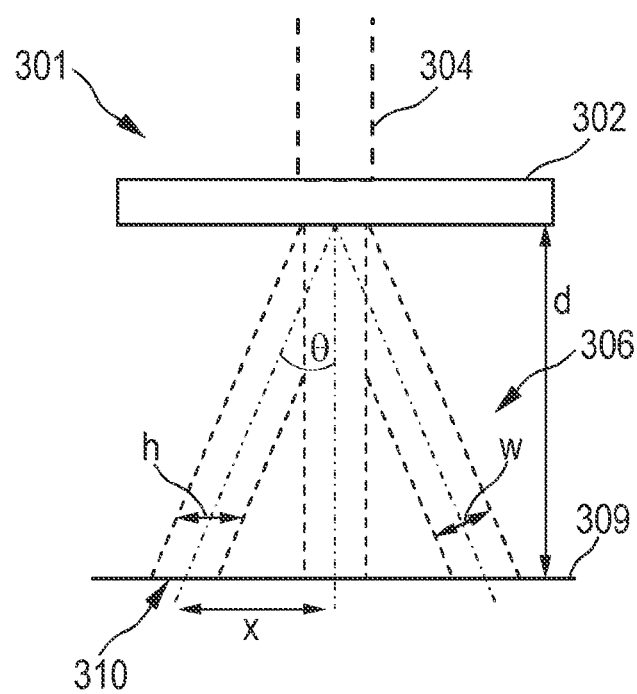

FIG. 10 illustrates an embodiment of a lighting apparatus providing collimated multiple separate light beams 306 generated by using a light beam 304 generated by a light source of the lighting apparatus and a liquid crystal element 302 of the lighting apparatus, wherein the liquid crystal element 302 comprises a periodic structure for generating a periodic phase pattern if voltage is applied to the liquid crystal element 302. In the situation shown in FIG. 10, voltage is applied to the liquid crystal cell 302 for generating a periodic phase pattern which diffracts the light beam 304 such that multiple collimated separate beams 306 are generated. The multiple separate light beams 306 form a light pattern on a projection surface 309. On the projection surface 309 light spots 310 are generated, wherein the light beam 304 and/or the liquid crystal element 302 are adapted such that the separation distance x between two spots 310 is larger than the sum of the half width of adjacent spots 310. Concerning the separation distance x indicated in FIG. 10, this corresponds to x>(W/2)+ (h/2), wherein W indicates the beam width of a separate diffracted light beam and h indicates a projected width of the left diffracted beam in FIG. 10, i.e. the width of this beam, which has been projected onto the projection surface 309.

The light spots on the projection surface cover preferentially small surface areas in order to have high intensities without the need for high laser powers. This can ensure eye safety. Preferably, the light spots of the multiple separate light beams have a cross-section area of less than 15 mm$^2$, further preferred a cross-section smaller than 3 mm$^2$, and even further preferred the light spots have a cross-section area of about 0.7 mm$^2$.

Figure 11:
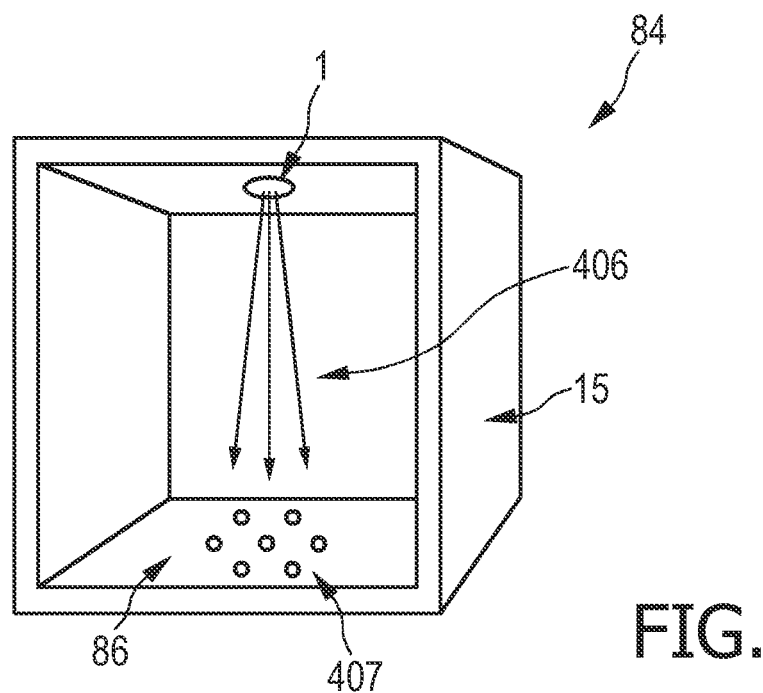
FIGS. 11 to 14 show embodiments of product presentation apparatus comprising an open casing for showing products, wherein the open casing comprises the lighting apparatus.
Figure 12:
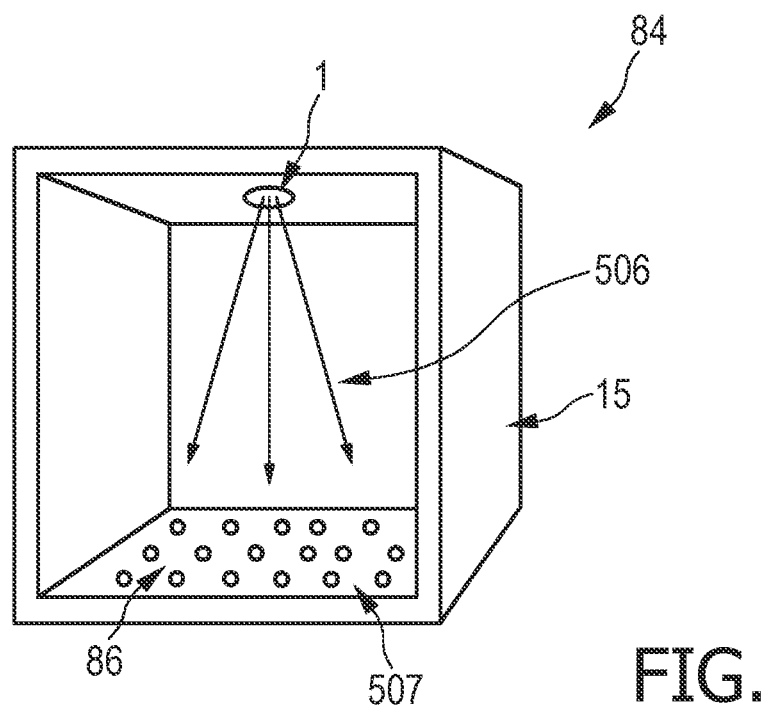

FIG. 11 shows schematically and exemplarily an embodiment of a product presentation apparatus 84 comprising an open casing 15 for showing products, which can be located within the open casing 15. The casing 15 comprises the lighting apparatus 1 for generating a light pattern 407 in a presentation area 86, i.e. voltage is applied to the liquid crystal cell of the lighting apparatus 1 for generating a periodic phase pattern and light of the light source is diffracted by the generated periodic phase pattern such that multiple separate light beams are generated in different directions, wherein these diffracted multiple separate light beams 406 form the light pattern 407. By modifying the voltage applied to the liquid crystal cell, the light pattern can be modified as schematically and exemplarily shown in FIG. 12. FIGS. 11 and 12 show the same product presentation apparatus 84 with the same open casing 15 and with the same lighting apparatus 1. The only difference is that in FIG. 11 and in FIG. 12 different voltages are applied to the liquid crystal cell of the lighting apparatus 1 for generating different light patterns 407, 507.

The light source of the lighting apparatus 1 can be adapted to emit light having different wavelengths. For example, the light source can be comprised of a first light source and a second light source emitting different colours. This allows generating light patterns having different colours.

Figure 13:
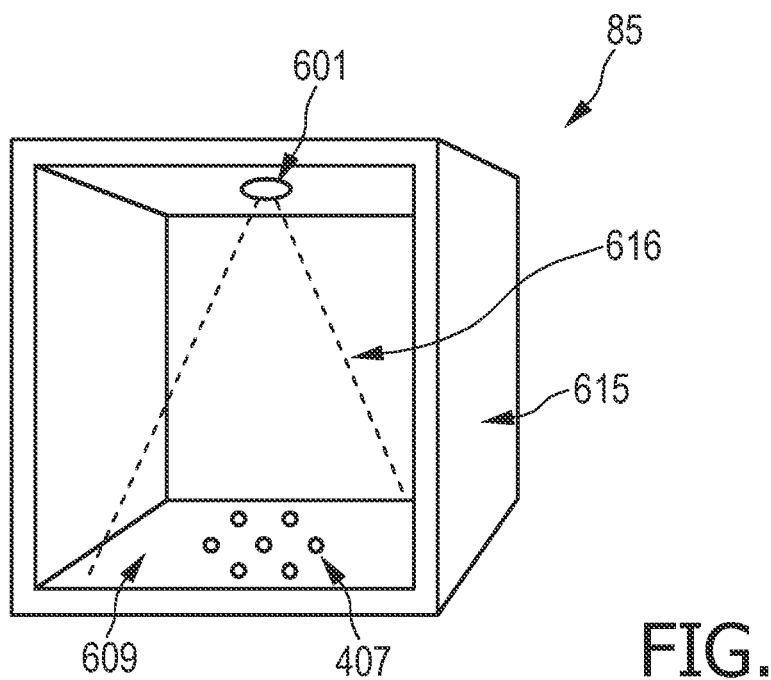
Figure 14:
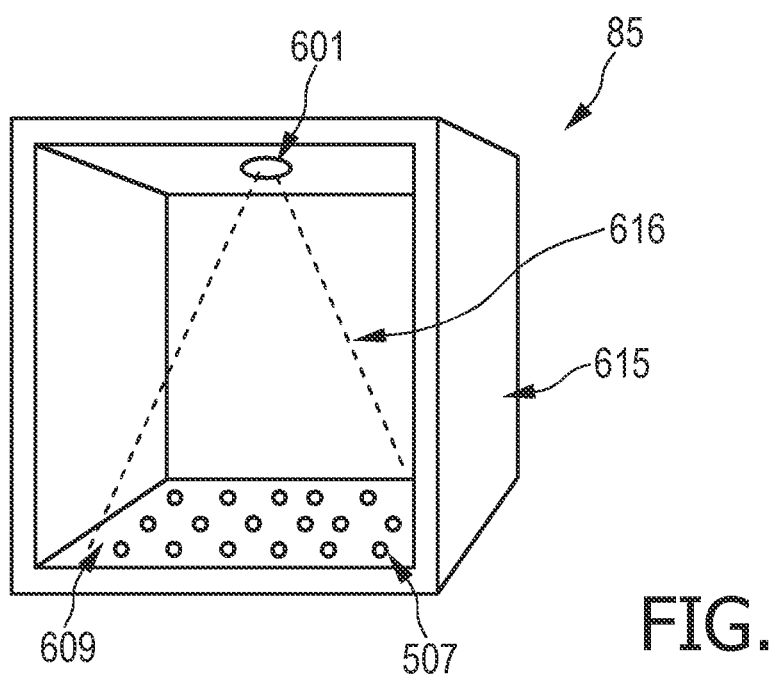

The light source of the lighting apparatus is preferentially a laser. In addition, a light emitting diode can be provided for illuminating a presentation area 609 of an open casing 615 of a product presentation apparatus 85. The product presentation apparatus is schematically and exemplarily shown in FIGS. 13 and 14. The light emitting diode can be located next to or around the laser. The radiation 616 of the light emitting diode can be controlled independently of the light pattern 407, 507 generated by the laser light as shown in FIGS. 13 and 14, or the illumination by the light emitting diode can be dependent on the shape of the light pattern 407, 507 generated by the laser light. For example, the illumination by the light of the light emitting diode can be adapted such that a part of the presentation area 609 is illuminated by the light emitting diode just covering the part of the presentation area 609 covered by the laser light pattern 407, 507.

Referring again to FIG. 1, the lighting apparatus preferentially further comprises a detection unit 17 for generating a detection signal depending on, for example, a detected movement, a detected temperature, detected light et cetera. The detection signal generated by the detection unit 17 is provided to a voltage determining unit 18 for determining a voltage, which should be applied to the liquid crystal cell 2, depending on the provided detection signal. The voltage determining unit 18 preferentially comprises a look-up table, in which for different detection signals voltages are stored, which should be applied to the liquid crystal cell 2, if the respective detection signal is provided by the detection unit 17. For example, in a rest state the lighting apparatus can be adapted to illuminate key products in a store, for example, in the above mentioned open casing. Key products may be jewellery, shoes or other premium accessories. This illumination is preferentially an illumination with a light pattern generated by the lighting apparatus, which may be combined with an illumination with the above mentioned light emitting diode. When a customer approaches the products, this approach can be detected by the detection unit 17 which generates a detection signal provided to the voltage determining unit 18, which determines a voltage and provides the determined voltage to the voltage source 8 for modifying the voltage applied to the liquid crystal cell 2, thereby changing the light pattern. The detection unit 17 can also be connected to the light emitting diode such that the illumination of the light emitting diode is modified if a detection signal is generated which indicates, for example, an approaching customer.

Although in FIGS. 11 to 14, the light pattern is projected only on a single inner surface of the casing, in other embodiments, the light pattern can alternatively or additionally be projected on other inner surfaces of the casing. Moreover, the casing can comprise more than only one lighting apparatus, in particular, for projecting light patterns on different inner surfaces of the casing.

Figure 15:
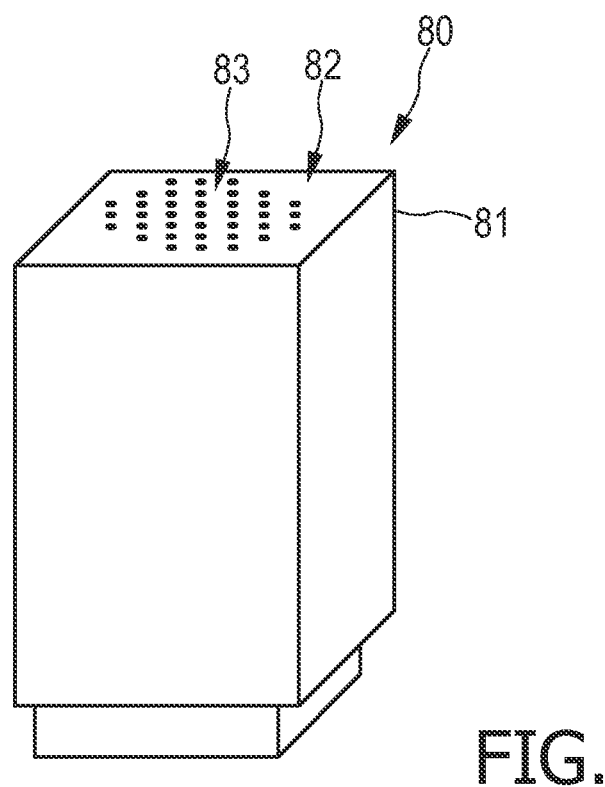
FIG. 15 shows schematically and exemplarily a further embodiment of a product presentation apparatus comprising a casing with an inside lighting apparatus.

FIG. 15 shows schematically and exemplarily a further embodiment of a product presentation apparatus for presenting products. The product presentation apparatus 80 comprises a casing 81 having a top side 82. The top side 82 is translucent for the light pattern generated by the lighting apparatus in accordance with the invention. The lighting apparatus in accordance with the invention is located within the casing 81. The lighting apparatus generates a light pattern which is directed onto the inner surface of the top side 82. Since the top side 82 is translucent, the generated light pattern 83 can be seen on the outer surface of the top side 82. Preferentially, a product is placed on the top side 82 on the product presentation apparatus 80. The outer surface of the top side 82 can therefore be regarded as a presentation area. By modifying the voltage applied to the liquid crystal cell of the lighting apparatus, the light pattern 83 on the top side 82 can be modified. In other embodiments, also other sides of the casing 81 can be translucent, and the lighting apparatus within the casing 81 can be directed to these other translucent sides for generating a light pattern on an outer surface of these other sides.

Figure 16:
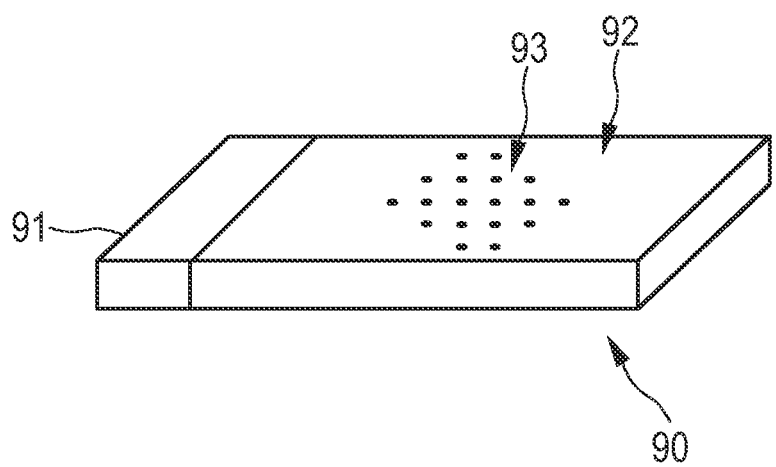
FIG. 16 shows schematically and exemplarily a further embodiment of a product presentation apparatus being a shelf with an inside lighting apparatus.

FIG. 16 shows schematically and exemplarily product presentation apparatus being a shelf 90 comprising a compartment 91 with a lighting apparatus in accordance with the invention, i.e. the lighting apparatus is located within the compartment 91. The upper side 92 of the shelf 90 is translucent to the light pattern generated by the lighting apparatus within the compartment 91. The lighting apparatus is adapted such that the light pattern is directed onto the inner surface of the upper side 92 of the shelf 90. Thus, the light pattern 93 is visible on outer surface of the upper side 92 of the shelf 90. Preferentially, a product is placed on the outer surface of the upper side 92 of the shelf 90. This outer surface can therefore be regarded as a presentation area. By modifying the voltage applied to the liquid crystal cell of the lighting apparatus within the compartment 91, the light pattern 93 on the outer surface of the upper side 92 of the shelf 90 can be modified. The shelf 90 preferentially comprises a suspension mechanism for attaching the shelf to a wall or the like.

The lighting effects generated by the lighting apparatus in accordance with the invention can also be used in other products such as consumer electronics like CD and/or DVD players, toys, et cetera.

Although in the above described embodiments, the lighting apparatus is used for displaying products, the lighting apparatus can also be used for other purposes, for example, as luminaire, wallwasher et cetera.

Figure 17:
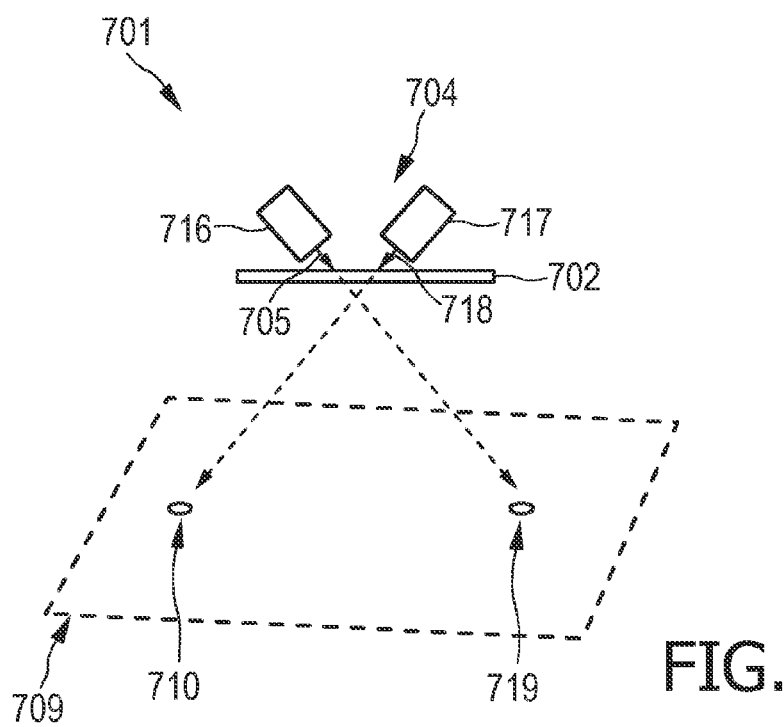
FIGS. 17 and 18 show schematically and exemplarily a further embodiment of a lighting apparatus, wherein two light beams are directed onto a liquid crystal cell.
Figure 18:
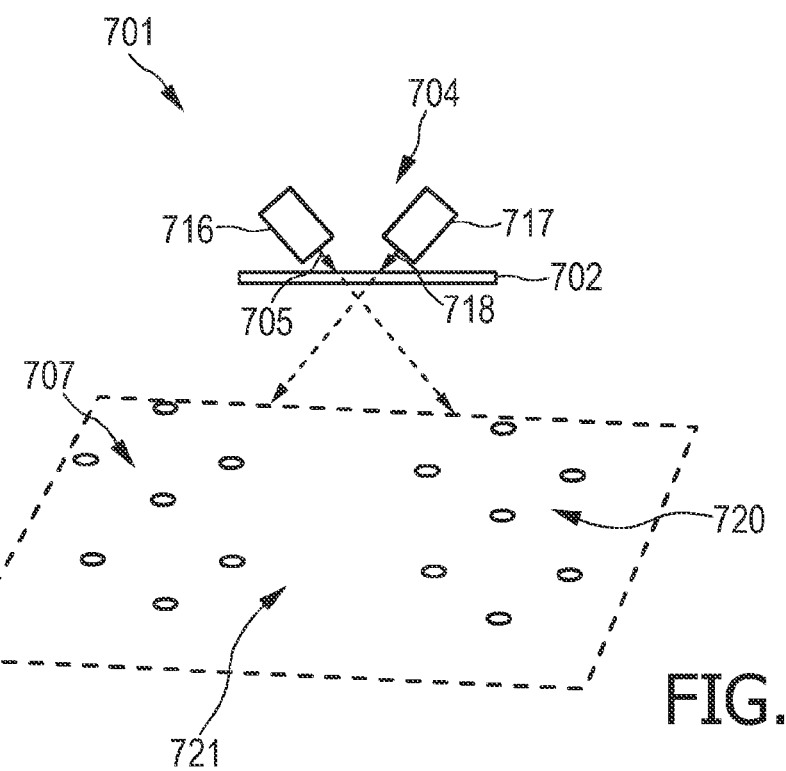

FIGS. 17 and 18 show schematically and exemplarily a light source 704 and a liquid crystal cell 702 of a lighting apparatus 701. The lighting apparatus 701 comprises the further elements shown in FIG. 1 like the voltage source, which are not shown in FIGS. 17 and 18 for clarity reasons. The light source 704 comprises a first light source 716 and a second light source 717 for emitting two light beams 705, 718. The two light beams 705, 719 are directed onto the liquid crystal cell 702. In FIG. 17 voltage is not applied to the liquid crystal cell 702. Thus, the two light beams form two spots 710, 719 on a projection surface 709. In the situation shown in FIG. 18, voltage is applied to the liquid crystal cell 702 for generating a periodic phase pattern which diffracts the light beams 705, 718 of the light source 704. This diffraction generates the light patterns 707 and 720 on the projection surface 709. This allows to define an area 721 on the projection surface 709 located between the two light patterns 707, 720. Thus, an area can be created surrounded by light patterns.

Figure 19:
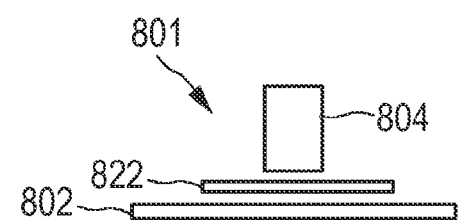
FIGS. 19 and 20 show schematically and exemplarily a further embodiment of the lighting apparatus comprising a passive diffractive element between a light source and a liquid crystal cell.
Figure 19:
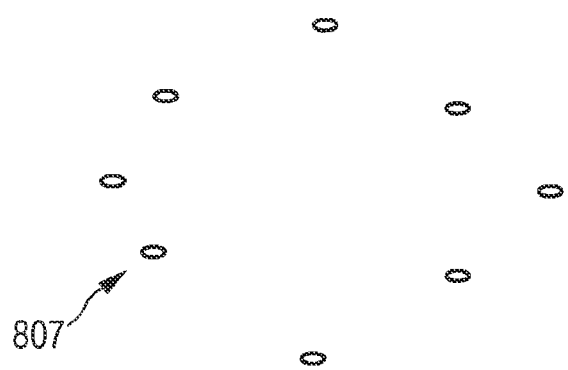
Figure 20:
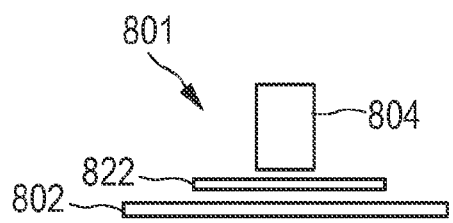
Figure 20:
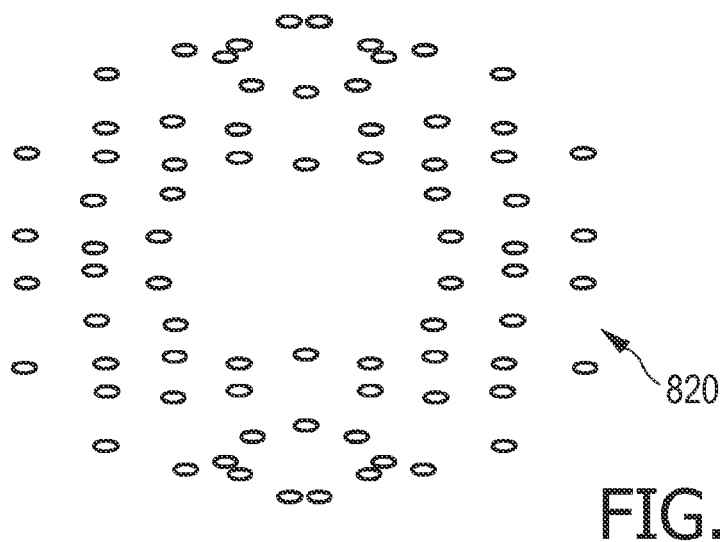

FIGS. 19 and 20 show schematically and exemplarily a further embodiment of a lighting apparatus 801 comprising a light source 804, a liquid crystal cell 802 and a passive diffractive element 822 arranged between the light source 804 and the liquid crystal cell 802. The passive diffractive element 822 is adapted to divide the light generated by the light source 804 into several light beams for being directed onto the liquid crystal cell 802. Also the lighting apparatus 801 comprises further elements shown in FIG. 1, in particular, the voltage source, which are not shown in FIGS. 19 and 20 for clarity reasons. In the situation shown in FIG. 19, voltage is not applied to the liquid crystal cell 802. The pattern 807 corresponds therefore to the different light beams generated by the passive diffractive element 822. In the situation shown in FIG. 20, voltage is applied to the liquid crystal cell 802 for generating a periodic phase pattern which diffracts the different light beams generated by the passive diffractive element. Thus, by applying voltage to the liquid crystal cell 802, the light pattern is modified to the light pattern 820 shown in FIG. 20.

The lighting apparatus can comprise several liquid crystal cells comprising a periodic structure for generating a periodic phase pattern by applying voltage to the respective liquid crystal cell. In particular, the lighting apparatus can comprise a first liquid crystal cell comprising a first periodic structure for generating a first periodic phase pattern by applying voltage to the first liquid crystal cell and a second liquid crystal cell comprising a second periodic structure for generating a second periodic phase pattern by applying voltage to the second liquid crystal cell. The light source, the first liquid crystal cell and the second liquid crystal cell are preferentially arranged such that the light beam generated by the light source is directed onto the first liquid crystal cell for generating several first diffractive light beams being directed onto the second liquid crystal cell for generating the multiple separate light beams in different directions by diffraction for forming the light pattern.

Figure 21:
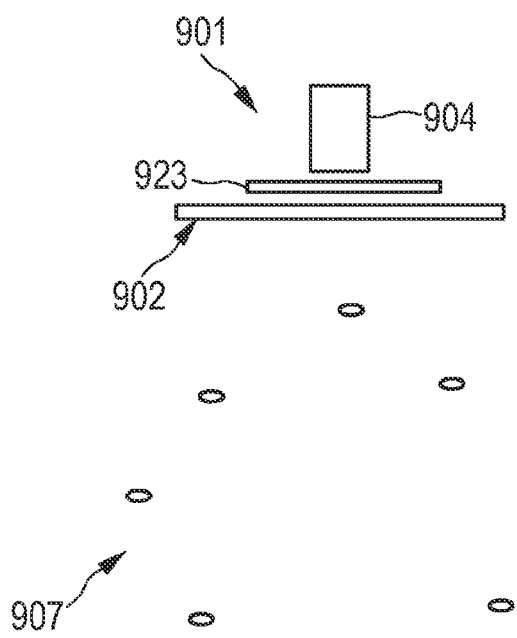
FIGS. 21 and 22 show schematically and exemplarily a further embodiment of a lighting apparatus comprising a first liquid crystal cell for collimation between a second liquid crystal cell for diffraction and a light source.
Figure 22:
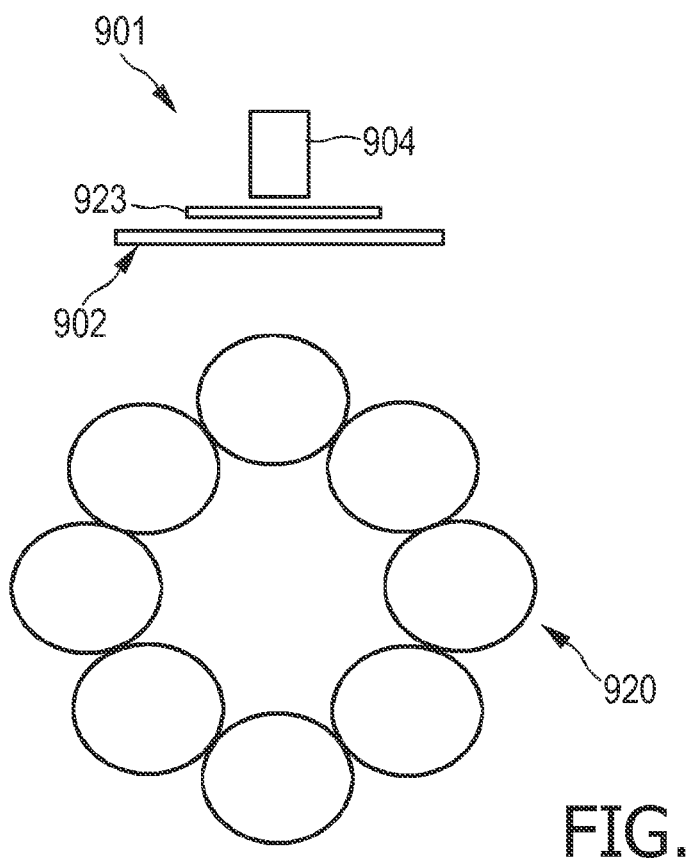

FIGS. 21 and 22 show schematically and exemplarily a further embodiment of a lighting apparatus 901 comprising a light source 904, a first liquid crystal cell 923 for collimating light depending on an applied voltage and a second liquid crystal cell 902 comprising a periodic structure for generating a periodic phase pattern by applying voltage to the second liquid crystal cell 902. Also the lighting apparatus 901 comprises further elements shown in FIG. 1. In particular, the lighting apparatus 901 comprises a voltage source for applying voltage to the first liquid crystal cell and to the second liquid crystal cell. The first liquid crystal cell and the second liquid crystal cell are preferentially addressable independently from each other.

The light source 904, the first liquid crystal cell 923 and the second liquid crystal cell 902 are arranged such that the light beam generated by the light source 904 is directed onto the first liquid crystal cell 923 for collimating the light beam generated by the light source 904, wherein the collimated light beam is directed onto the second liquid crystal cell 902 for generating the multiple separate light beams in different directions by diffraction.

In the situation shown in FIG. 21 the first liquid crystal cell is switched off, i.e. voltage is not applied to the first liquid crystal cell 923. But, voltage is applied to the second liquid crystal cell 902, thereby generating a periodic phase pattern within the second liquid crystal cell 902 which diffracts the light such that the light pattern 907 is generated. In the situation shown in FIG. 22 voltage is applied to both liquid crystal cells, i.e. also the first liquid crystal cell for collimation is switched on. The width of the light spots of the light pattern 920 is thereby increased.

The first liquid crystal cell 923 functions as a single lens as it uses a single structure which is equal or larger than the width of the light beam, whereas the second liquid crystal cell 902 has a periodic structure being smaller, in particular, much smaller, than the width of the light beam to produce a light pattern by diffraction. The period of the periodic structure is preferentially 100 micron or smaller, further preferred 50 micron or smaller, and even further preferred 20 micron or smaller.

If the lighting apparatus comprises several liquid crystal elements, the liquid crystal elements can be activated sequentially or simultaneously.

The lighting apparatus can be used for decorative lighting, wherein the generated light pattern is superimposed on a background illumination. For example, a light emitting diode can be used for generating the background illumination. The liquid crystal cell can be used for changing scene settings and for producing dynamic effects. In particular, the liquid crystal cell can produce simple switchable light patterns.

When the liquid crystal cell is used for generating a light pattern, the local intensity, i.e. the intensity of one light beam of the multiple separate light beams generated by diffraction, on the projection surface is considerably reduced with respect to the intensity of the light beam generated by the light source. For example, if the light beam generated by the light source is diffracted such that ten light spots form the light pattern, the intensity of each of the light spots is ten times lower than the intensity of the light beam generated by the light source. This reduced intensity of the light spots on the projection surface can lead to a reduced visibility of the light spots. Therefore, it may be desired to increase the intensity of the light beam generated by the light source to obtain an intensity of the light spots on the projection surface giving good enough visibility. On the other hand it is generally important that increasing the intensity of the light beam generated by the light source do not lead to a situation, in which the light spots forming the light pattern are not eye safe. It is therefore preferred that the light pattern is generated such that the light pattern is eye safe. The lighting apparatus comprises therefore preferentially a feedback mechanism from the liquid crystal cell to the light source such that if the periodic phase pattern within the liquid crystal cell is modified, the intensity of the light beam generated by the light source is adjusted in a manner that the light pattern remains or becomes safe to the human eye.

Referring again to FIG. 1, the lighting apparatus 1 further comprises a control unit 30 for controlling at least one of the light source 4 and the voltage source 8 such that the intensity of each of the multiple light beams 6 generated by diffraction is below a predefined threshold related to eye safety. This threshold is preferentially the maximum permissible exposure (MPE) being the highest power or energy density of a light source that is considered to be eye safe. The control unit 30 comprises preferentially assignments between voltages for being applied to the liquid crystal and maximum values being indicative of a allowed maximum intensity of the light beam 5 generated by the light source 4 ensuring eye safety. In this embodiment, the light source 4 is a laser and the control unit comprises assignments between voltages for being applied to the liquid crystal cell and maximum laser powers ensuring eye safety. The assignments are preferentially determined by calibration, i.e., for example, for a constant alternating voltage applied to the liquid crystal cell the intensity of the light beam 5 generated by the light source 4 is increased until the intensities of the multiple separate light beams become unsafe. For the calibration procedure the intensity of each of the multiple separate diffracted light beams 6 is preferentially measured by a photodiode or another detection unit.

Figure 23:
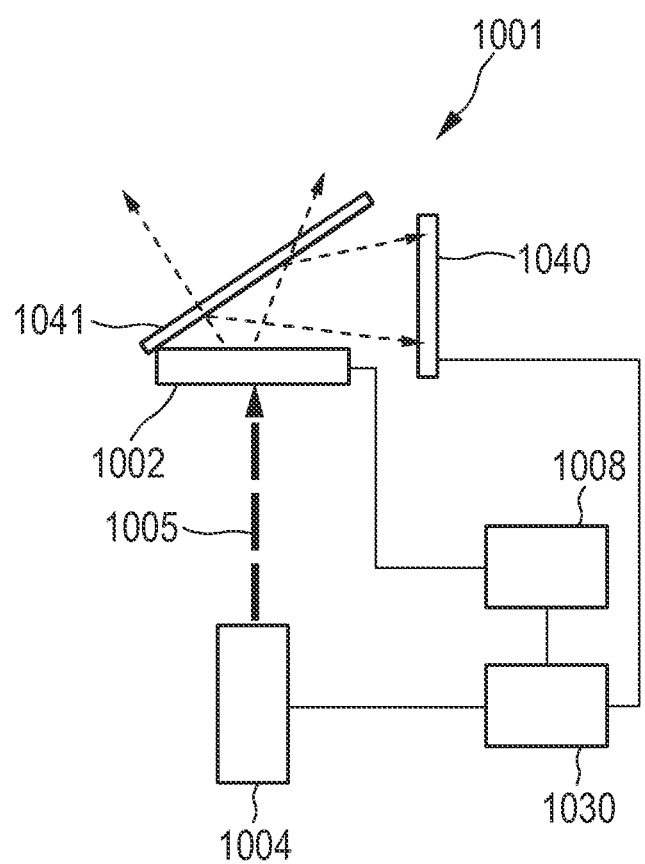
FIG. 23 shows schematically and exemplarily a further embodiment of a lighting apparatus.

FIG. 23 shows schematically and exemplarily a further embodiment of a lighting apparatus 1001. The lighting apparatus 1001 comprises an intensity determination unit 1040 being, in this embodiment, a CCD camera, for determining the intensity of the multiple separate light beams. The lighting apparatus 1001 further comprises a control unit 1030 being adapted to control at least one of a light source 1004 of the lighting apparatus 1001 and a voltage source 1008 such that the intensity of each of the multiple light beams generated by diffraction is below a predefined threshold depending on the determined intensities of the multiple separate light beams. Also in this embodiment the threshold is related to eye safety, i.e. the threshold is preferentially the MPE. The intensity determination unit 1040 detects the intensity of the light trapped from the multiple separate diffracted light beams by using a transmitting and reflecting element 1041 like a beam splitter.

The MPE is the highest power or energy density (in $J/cm^2$ or $W/cm^2$) of a light source that is considered safe. It is usually about 10% of the dose that has a 50% chance of creating damage under worst-case conditions. The MPE is measured at the cornea of the human eye for a given wavelength and exposure time.

Figure 24:
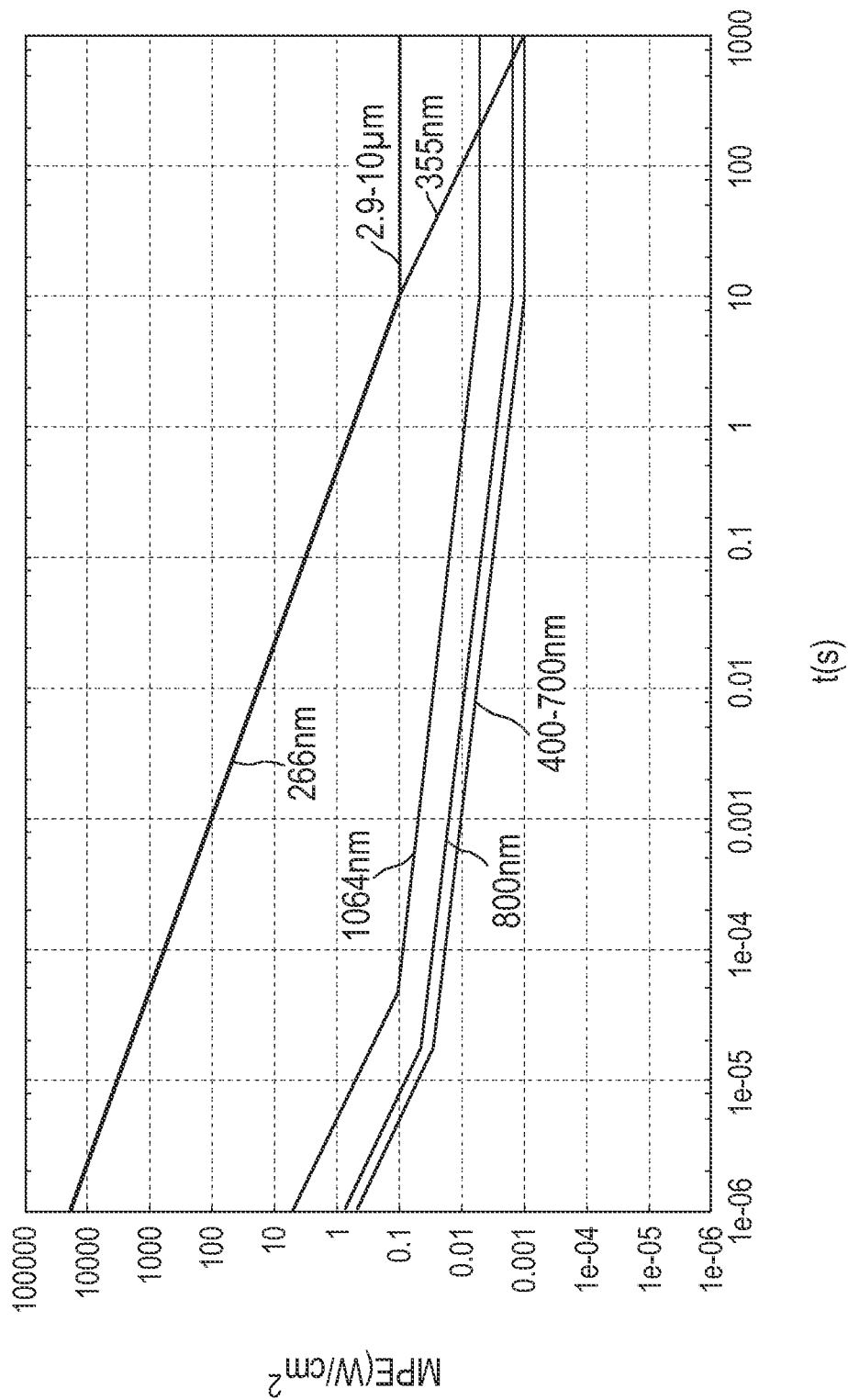
FIG. 24 shows a maximum permissible exposure depending on exposure time.

A calculation of the MPE for ocular exposure takes into account the various ways light can act upon the eye. Thermal and photochemical retinal injury has been shown to dominate at wavelengths beyond 400 nm. In addition to the wavelength and exposure time, the MPE takes into account the spatial distribution of the light (from a laser or otherwise). Collimated laser beams of visible light are especially dangerous at relatively low powers because the lens focuses the light onto a tiny spot on the retina. Distribution of the light on the retina by light sources with a smaller degree of spatial coherence is larger than a well-collimated laser. For such sources, the MPE is higher than for collimated laser beams. In the MPE calculation, the worst-case scenario is assumed, in which the eye lens focuses the light into the smallest possible spot size on the retina for the particular wavelength and the pupil is fully open. Although the MPE is specified as power or energy per unit surface, it is based on the power or energy that can pass through a fully open pupil (0.39 cm$^2$) for visible wavelengths. In FIG. 24 MEP for laser light is plotted as a function of exposure time t. Here it can be seen that for exposures longer than 10 s the MEP is constant. This indicates that, for example, for a fully open pupil of 0.39 cm$^2$ the maximum allowable laser power is 0.39 mW.

Lasers are high intensity light sources and they are being considered for their use in decorative lighting, (interactive) shop lighting concepts and atmosphere creation. Due to high intensity they are highly visible already at low powers and show desirable sparkling appearance. It is therefore desirable to produce patterns with multiple spots having the sparkling appearance. This can generally be done using a SLM. However such a SLM is rather expensive and bulky. The above described embodiments of a lighting apparatus use therefore a liquid crystal cell comprising a periodic structure which leads to the formation of a periodic phase pattern, where the periodic phase pattern can locally be adjusted by an electric field, in combination with a beam of light with a suitable size and collimation so that spots do preferentially not overlap on a projection surface. During the application of an electric field a periodic variation in the refractive index is produced. When such a pattern is illuminated with a beam of light, diffraction peaks are produced due to the periodicity in the system. This pattern is then convoluted by the diffraction pattern due to the refractive index distribution in each of the repeating units. As a result of this, a diffraction pattern, which can be controlled by the applied electric field, can be obtained. For this purpose, for example, a graded refractive index lens array or a replicated liquid crystal lens array can be used. Such an element can also be combined with another device controlling the divergence of the laser beam so that many different types of lighting effects can be obtained by such simple compact devices.

Figure 25:
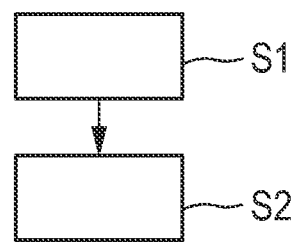
FIG. 25 shows a flowchart exemplarily illustrating an embodiment of a lighting method for generating a light pattern.

In the following a lighting method for generating a light pattern will exemplarily be described with reference to a flowchart shown in FIG. 25.

In step S1, a light beam is generated by a light source and directed onto a liquid crystal cell. The liquid crystal cell comprises a periodic structure for generating a periodic phase pattern, if voltage is applied to the liquid crystal cell.

In step S2, voltage is applied to the liquid crystal cell, thereby generating the periodic phase pattern. The light beam generated by the light source is diffracted by the generated periodic phase pattern in different directions, wherein the multiple separate light beams form a light pattern.

Step S2 can be performed before step S1, step S1 can be performed before step S2, and these two steps can be performed simultaneously.

Figure 26:
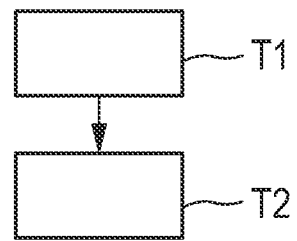
FIG. 26 shows a flowchart exemplarily illustrating an embodiment of a product presentation method for presenting a product.

In the following a product presentation method for presenting a product will exemplarily be described with reference to a flowchart shown in FIG. 26.

In step T1, a product is placed in a presentation area, and in step T2, multiple separate light beams are generated for forming a light pattern in accordance with the above described lighting method, wherein the multiple separate light beams are directed to the presentation area for forming the light pattern in the presentation area.

Although in the above described embodiments different elements of the lighting apparatus are described with respect to different embodiments of the lighting apparatus, these different elements can also be part of the same lighting apparatus. For example, the liquid crystal cells described above with reference to FIGS. 3-6 can be used with the further elements described above with reference to FIG. 1, i.e. instead of the liquid crystal cell 2 shown in FIG. 1 another liquid crystal cell can be used, in particular, another liquid crystal cell described above with reference to FIGS. 3-6 can be used. Moreover, further elements of the lighting apparatus explained above with reference to FIG. 1 can be used with the other embodiments of the lighting apparatus which are described above. For example, the detection unit and the voltage determining unit and/or the control unit and the intensity determination unit can be used with the above described embodiments of the lighting apparatus. Moreover, these elements, i.e. the detection unit and the voltage determination unit and/or the control unit and the intensity determination unit, can be omitted.

The lighting apparatus can be used with multiple lasers, i.e. the light source can comprise multiple lasers, which may vary in color. For instance, a blue and a green laser may be used, or a blue, a green and a red laser may be used. The colors of the multiple separate light beams generated by diffraction at the periodic phase pattern may be varied depending on the voltage applied to the liquid crystal cell, i.e. if the light pattern is modified by modifying the periodic phase pattern by modifying the applied voltage, at the same time the color of the light pattern can be modified by varying the color of the one or several light beams generated by the light source for being directed onto the liquid crystal cell.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The control of the lighting apparatus in accordance with a corresponding lighting method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a lighting apparatus for generating a light pattern. A light source generates a light beam for being directed onto a liquid crystal cell. The liquid crystal cell comprises a periodic structure. If voltage is applied to the liquid crystal cell by a voltage source, a period phase pattern is generated. The liquid crystal cell and the light source are adapted such that multiple separate light beams are generated in different directions by diffraction at the generated periodic phase pattern, wherein the multiple separate light beams form the light pattern. Since the light pattern is generated by diffraction at the periodic phase pattern, which is modifiable by applying voltage, different light patterns can be generated, in particular, for decorative purposes, in a technically relatively simple way.

The invention claimed is:
1. A lighting apparatus for generating a light pattern for decorative purposes, the lighting apparatus comprising:

a liquid crystal cell comprising a periodic structure for generating a periodic phase pattern by applying a voltage to the liquid crystal cell, a light source for generating a light beam being directed onto the liquid crystal cell, a voltage source for applying voltage to the liquid crystal cell, wherein the liquid crystal cell and the light source are configured such that multiple separate light beams are generated in different directions by diffraction at the generated periodic phase pattern, wherein the multiple separate light beams form the light pattern, wherein the light source emits at least two light beams being directed onto the liquid crystal cell in different directions.

2. The lighting apparatus as defined in claim 1, wherein an intensity distribution is defined by the intensities of the multiple separate light beams and wherein the liquid crystal cell and the light source are configured such that the intensity distribution is modifiable by modifying the voltage applied to the liquid crystal cell.

3. The lighting apparatus as defined in claim 1, further comprising a projection surface wherein the light source and/or the liquid crystal cell configured such that the multiple separate light beams form substantially non-overlapping spots on the projection surface.

4. The lighting apparatus as defined in claim 1, wherein the liquid crystal cell comprises at least one of a graded refractive index lens array using Double Plane Switching (DPS), a graded refractive index lens array using In Plane Switching (IPS), a graded refractive index lens array using Fringe Field Switching (FFS), a replicated liquid crystal lens array and a pattern-wise polymerized liquid crystal cell.

5. The lighting apparatus as defined in claim 1, wherein the lighting apparatus further comprises a passive diffractive element arranged between the light source and the liquid crystal cell, wherein the passive diffractive element is configured to divide the light generated by the light source into several light beams for being directed onto the liquid crystal cell.

6. The lighting apparatus as defined in claim 1, wherein the lighting apparatus comprises a first liquid crystal cell for collimating light depending on an applied voltage and a second liquid crystal cell comprising a periodic structure for generating a periodic phase pattern by applying voltage to the second liquid crystal cell, wherein the light source, the first liquid crystal cell and the second liquid crystal cell are arranged such that the light beam generated by the light source is directed onto the first liquid crystal cell for collimating the light beam generated by the light source wherein the collimated light beam is directed onto the second liquid crystal cell for generating the multiple separate light beams in different directions by diffraction.

7. The lighting apparatus as defined in claim 1, further comprising a control unit for controlling at least one of the light source and the voltage source such that the intensity of each of the multiple light beams generated by diffraction is below a predefined threshold.

8. The lighting apparatus as defined in claim 7, further comprising an intensity determination unit for determining the intensity of the multiple separate light beams, wherein the control unit is configured to control at least one of the light source and the voltage source such that the intensity of each of the multiple light beams generated by diffraction is below a predefined threshold depending on the determined intensity of the multiple separate light beams.

9. A product presentation apparatus for presenting a product, the product presentation apparatus comprising a presentation area in which the product is to be placed and a lighting apparatus as defined in claim 1, wherein the lighting apparatus is configured to direct the multiple separate light beams to the presentation area for forming the light pattern in the presentation area.

10. A lighting method for generating a light pattern for decorative purposes, the lighting method comprising following steps:

applying voltage to a liquid crystal cell having a periodic structure for generating a periodic phase pattern and comprising at least one of a graded refractive index lens array using Double Plane Switching (DPS), a graded refractive index lens array using In Plane Switching (IPS), a graded refractive index lens array using Fringe Field Switching (FFS), a replicated liquid crystal lens array and a pattern-wise polymerized liquid crystal cell, and generating a light beam for being directed onto the liquid crystal cell wherein multiple separate light beams are generated in different directions by diffraction at the generated periodic phase pattern, wherein the multiple separate light beams form the light pattern.

11. A lighting apparatus for generating a light pattern for decorative purposes, the lighting apparatus comprising:

a liquid crystal cell comprising a periodic structure for generating a periodic phase pattern by applying a voltage to the liquid crystal cell, a light source for generating a light beam being directed onto the liquid crystal cell, a voltage source for applying voltage to the liquid crystal cell, wherein the liquid crystal cell and the light source are configured such that multiple separate light beams are generated in different directions by diffraction at the generated periodic phase pattern, wherein the multiple separate light beams form the light pattern, and a control unit for controlling at least one of the light source and the voltage source such that the intensity of each of the multiple light beams generated by diffraction is below a predefined threshold.

12. A product presentation apparatus for presenting a product, the product presentation apparatus comprising a presentation area in which the product is to be placed and a lighting apparatus as defined in claim 11, wherein the lighting apparatus is configured to direct the multiple separate light beams to the presentation area for forming the light pattern in the presentation area.

13. A lighting apparatus for generating a light pattern for decorative purposes, the lighting apparatus comprising:

a liquid crystal cell comprising a periodic structure for generating a periodic phase pattern by applying a voltage to the liquid crystal cell, a light source for generating a light beam being directed onto the liquid crystal cell, a voltage source for applying voltage to the liquid crystal cell, wherein the liquid crystal cell and the light source are configured such that multiple separate light beams are generated in different directions by diffraction at the generated periodic phase pattern, wherein the multiple separate light beams form the light pattern, wherein the lighting apparatus further comprises a passive diffractive element arranged between the light source and the liquid crystal cell, wherein the passive diffractive element is configured to divide the light generated by the light source into several light beams for being directed onto the liquid crystal cell.

14. The lighting apparatus as defined in claim 13, further comprising an intensity determination unit for determining the intensity of the multiple separate light beams, wherein the control unit is configured to control at least one of the light source and the voltage source such that the intensity of each of the multiple light beams generated by diffraction is below a predefined threshold depending on the determined intensity of the multiple separate light beams.

15. A product presentation apparatus for presenting a product, the product presentation apparatus comprising a presentation area in which the product is to be placed and a lighting apparatus as defined in claim 13, wherein the lighting apparatus is configured to direct the multiple separate light beams to the presentation area for forming the light pattern in the presentation area.

16. The lighting apparatus as defined in claim 13, wherein an intensity distribution is defined by the intensities of the multiple separate light beams and wherein the liquid crystal cell and the light source are configured such that the intensity distribution is modifiable by modifying the voltage applied to the liquid crystal cell.

17. The lighting apparatus as defined in claim 13, further comprising a projection surface wherein the light source and/or the liquid crystal cell configured such that the multiple separate light beams form substantially non-overlapping spots on the projection surface.

18. The lighting apparatus as defined in claim 13, wherein the lighting apparatus comprises a first liquid crystal cell for collimating light depending on an applied voltage and a second liquid crystal cell comprising a periodic structure for generating a periodic phase pattern by applying voltage to the second liquid crystal cell, wherein the light source, the first liquid crystal cell and the second liquid crystal cell are arranged such that the light beam generated by the light source is directed onto the first liquid crystal cell for collimating the light beam generated by the light source wherein the collimated light beam is directed onto the second liquid crystal cell for generating the multiple separate light beams in different directions by diffraction.

19. The lighting apparatus as defined in claim 13, further comprising a control unit for controlling at least one of the light source and the voltage source such that the intensity of each of the multiple light beams generated by diffraction is below a predefined threshold.

* * * * *